(No Model.) 2 Sheets—Sheet 1.
A. F. COOK.
WATER FILTER.
No. 522,512. Patented July 3, 1894.
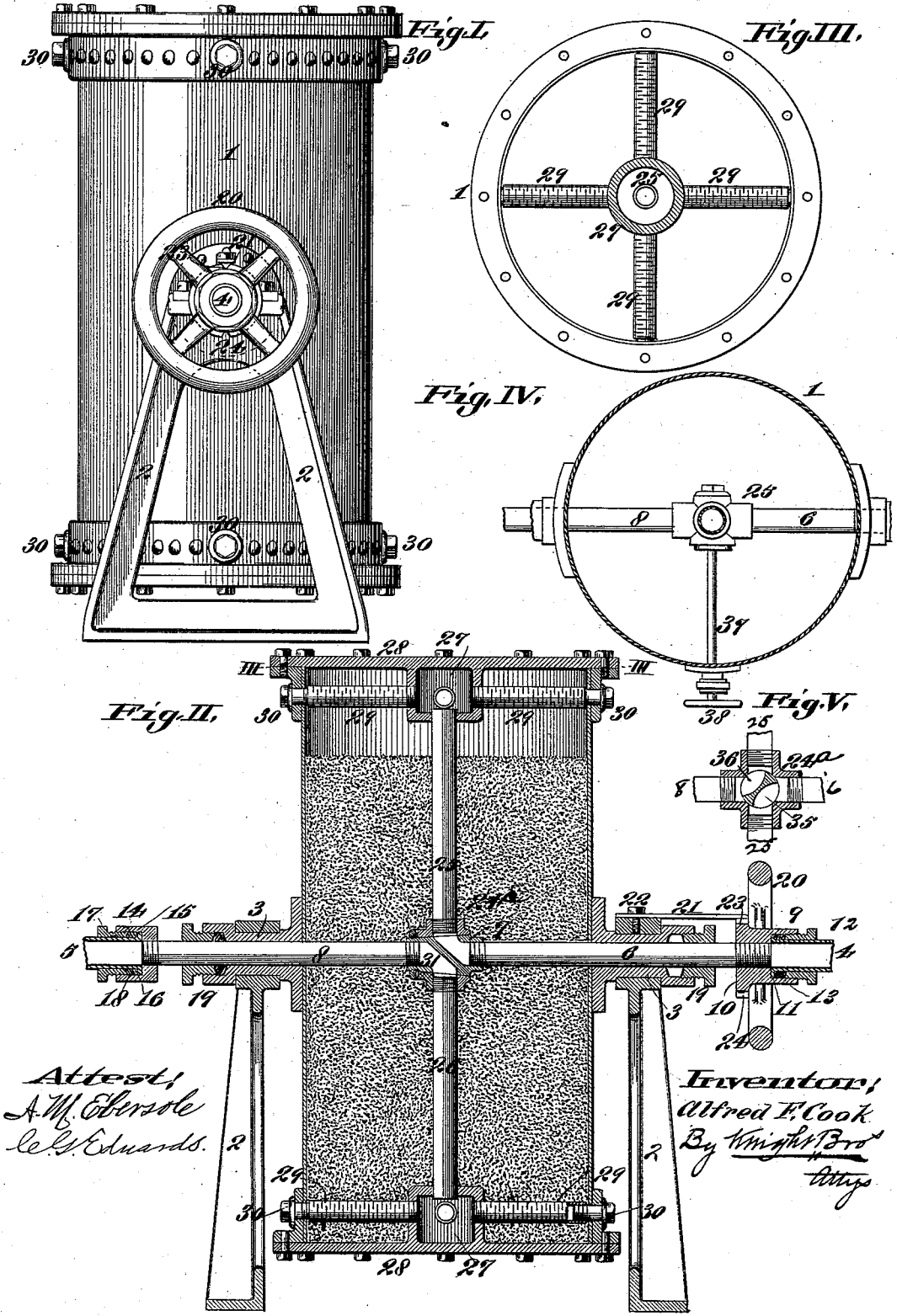
Attest:
A. M. Ebersole
C. G. Edwards
Inventor:
Alfred F. Cook
By Knight & Bro.
Attys (No Model.) 2 Sheets—Sheet 2.
A. F. COOK.
WATER FILTER.
No. 522,512. Patented July 3, 1894.
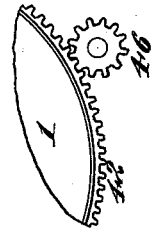
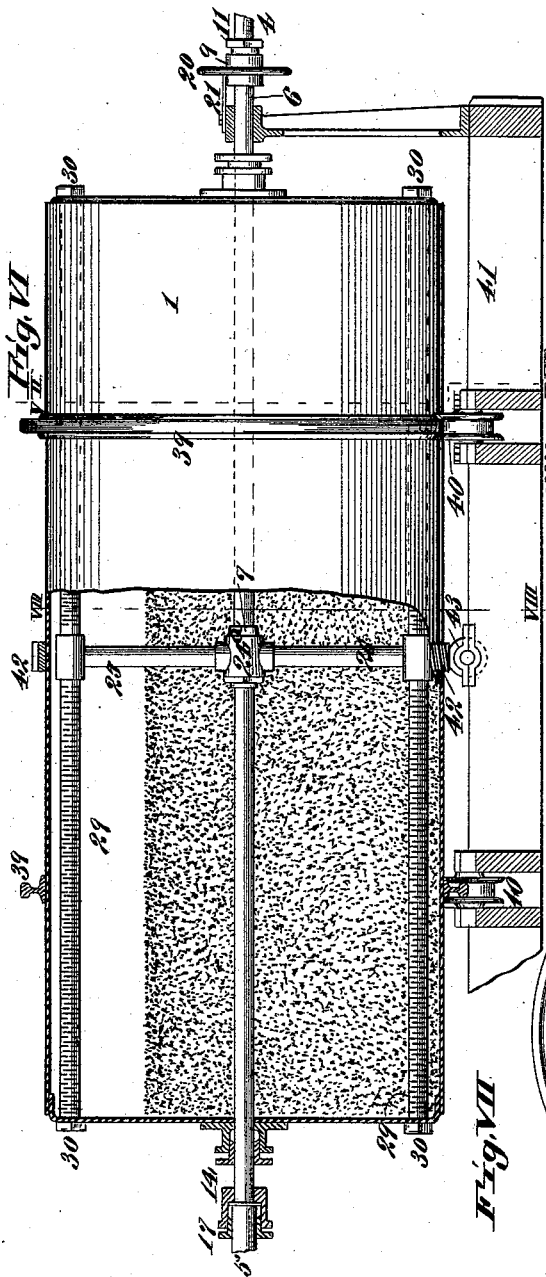
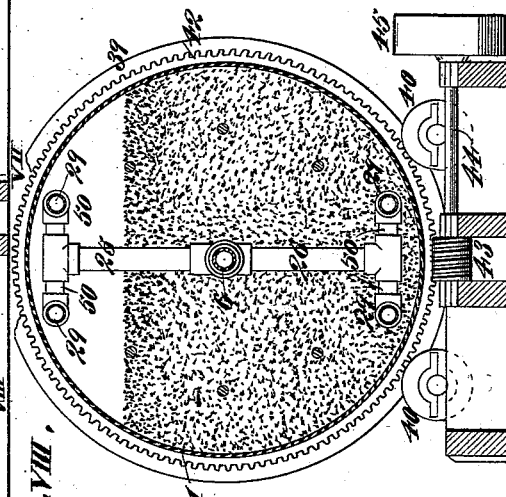
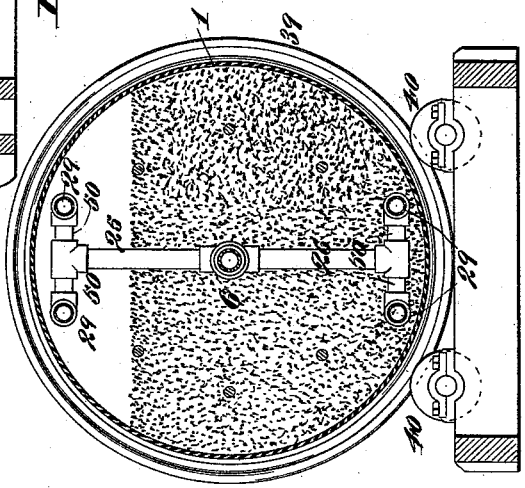
Attest:
A. W. Ebersole
C. G. Edwards.
Inventor:
Alfred F. Cook
By Knight Bro
Attys

UNITED STATES PATENT OFFICE.

ALFRED F. COOK, OF ST. LOUIS, MISSOURI.

WATER-FILTER.

SPECIFICATION forming part of Letters Patent No. 522,512, dated July 3, 1894.

Application filed December 11, 1893. Serial No. 493,292. (No model.)

*To all whom it may concern:*

Be it known that I, ALFRED F. COOK, of the city of St. Louis, in the State of Missouri, have invented a certain new and useful Improvement in Water-Filters, of which the following is a full, clear, and exact description, reference being had to the accompanying drawings, forming part of this specification.

My invention relates to certain improvements in water filters; and my invention consists in features of novelty hereinafter fully described and pointed out in the claims.

Figure I is an elevation of my improved filter. Fig. II is a vertical, longitudinal section of the filter. Fig. III is a horizontal section, taken on line III—III, Fig. II. Fig. IV is a horizontal section, showing a modification of the valve. Fig. V is a detail section of the form of valve shown in Fig. IV. Fig. VI is part in side view, and part in longitudinal section, showing the invention applied to a horizontal filter. Fig. VII is a transverse section, taken on line VII—VII, Fig. VI; and Fig. VIII is a similar view, taken on line VIII—VIII, Fig. VI. Fig. IX is a detail view, showing a modification.

Referring to the drawings, 1 represents a filtering tank or cylinder, supported on a suitable stand 2 by means of journals or arbors 3, so that the filter can be turned end for end.

4 represents the supply pipe, and 5 the discharge pipe.

6 represents a pipe extending from the supply pipe 4 to about the middle of the cylinder 1, where it connects with one end of a valve 7, and 8 represents a pipe extending from the discharge pipe 5 to about the center of the cylinder, where it connects with the other end of the valve 7. The pipe 4 is connected to the pipe 6 by means of a stuffing box 9, into one member 10 of which the outer end of the pipe 6 is screwed. The inner end of the pipe 4 has an out-turned flange 11, between which and the other member 12 of the box is the packing 13. The pipe 5 is connected to the outer end of the pipe 8 by means of a stuffing box 14, one member 15 of which is screwed onto the outer end of the pipe 8. The extreme inner end of the pipe 5 has an out-turned flange 16, between which and the other member 17 of the box is the packing 18. This form of connection between the pipes 4 and 5 and their respective pipes 6 and 8, permits of the pipes 6 and 8 being turned without turning the pipes 4 and 5.

19 are stuffing box connections between the pipes 6 and 8 and the arbors 3.

On the member 10 of the stuffing box 9 is a hand-wheel 20.

21 is a spring catch, secured at 22 to the stand 2, and having an end 23 for engaging notches 24 in the member 10 of the stuffing box 9.

Surrounding the valve 7 is a housing 24ª, with which connects a pipe 25, extending to one end of the cylinder 1, and a pipe 26, extending to the other end of the cylinder 1. The outer ends of the pipes 25 and 26 connect with chambers 27, formed in the heads 28 on the cylinder 1, and connecting with these chambers are also horizontal, perforated pipes 29, that extend to the sides of the cylinder. I have shown four of these pipes 29.

30 represents plugs passing through the walls of the cylinder, and the inner ends of which enter the ends of the pipes 29, so as to close the latter. By removing these plugs the pipes 29 can be easily cleaned out.

The valve 7 has a bridge 31, dividing the valve into two passages. With one of these passages the pipes 6 and the pipe 25 connect, and with the other passage the pipe 8 and the pipe 26 connect.

The operation is as follows: Water passes through the pipes 4 and 6, into the valve 7, and up through the pipe 25 into the upper chamber 27, from where it passes out through the pipes 29, and escapes through the perforations of the latter pipes and falls onto the filtering material. It percolates through the filtering material, to the lower pipes 29, into which it flows and enters the lower chamber 27, and then passes up through the pipe 26, through the pipe 8, and out through the pipe 5. When it is desired to change the course of the water through the filtering material, as is often the case, the pipes 6 and 8, with the valve 7, are turned by means of the hand wheel 20, thus bringing the passage of the valve, which registered with the pipe 25, into communication with the pipe 26, and bringing the other passage of the valve into communication with the pipe 25. The water will now pass from the pipe 6, down through the pipes 26, out through the lower pipes 29, up through the filtering material, in through the upper pipes 29, down through the pipe 25, and out through the pipes 8 and 5, and thus the course of the water may be changed quickly, and as often as may be desired. If it should be desired to reverse the cylinder 1, end for end, this can be done by applying slight pressure to it, the arbors 3 turning in the upper ends of the stand 2. To prevent the pipes 6 and 8, and the valve 7, turning with the cylinder, I provide the spring catch 21.

In Figs. IV and V, I have shown a modification of the valve 7, and the means for turning it. In this instance the valve has a passage-way 35, adapted to register with the pipes 6 and 26, and a passage-way 36, adapted to register with the pipes 8 and 25. The valve may be turned by a rod or stem 37, extending through the wall of the cylinder 1, and provided with a hand wheel 38. By turning the valve, the passage-way 35 will form a communication between the pipes 8 and 25, and the passage-way 36 will form a communication between the pipes 6 and 26, so that the course of the water can be changed, as in the other construction.

In Figs. VI, VII, VIII and IX, I have shown a cylinder in a horizontal position; the pipes 6, 8, 25 and 26, and the valve 7 being the same as in the other construction, excepting there are two pipes 29 on each side of the pipes 25 and 26, which are connected at their inner ends with the pipes 25 and 26 by means of nipples 50, and the outer ends of the pipes do not connect with a chamber 27, as in the other construction, but extend directly to the heads of the cylinder, as clearly shown in Figs. VI, VII and VIII. The cylinder is provided with bands 39, resting on friction rollers 40, journaled to the frame 41, which supports the cylinder. The cylinder in this instance may be turned by means of a circumferential rack 42, engaged by a worm wheel 43 on a shaft 44, provided with a hand wheel or pulley 45, or instead of the worm wheel, as shown in Fig. VIII, the pinion 46, as shown in Fig. IX, may be used.

I claim as my invention—

1. In a water filter, the combination of a cylinder for containing the filtering material, supply and discharge pipes extending to near the center of the cylinder, a valve having two passages, and with which said pipes connect, means for turning the valve, a housing inclosing the valve, pipes extending from the housing in either direction, chambers located at the heads of the cylinder, and with which said latter pipes connect, and perforated pipes connecting with said chambers; substantially as and for the purpose set forth.

2. In a water filter, the combination of a cylinder containing the filtering material, supply and discharge pipes extending to near the center of the cylinder, a valve having two passages, and with which said pipes communicate, means for turning the valve, a housing surrounding the valve, pipes leading from the housing toward the outer parts of the cylinder, perforated pipes communicating with said last mentioned pipes, and plugs 30 for closing the ends of said perforated pipes, and which may be removed to clean the pipes; substantially as and for the purpose set forth.

3. In a water filter, the combination of a cylinder containing the filtering material, supply and discharge pipes, a valve having two passages and with which said pipes communicate, means for turning the valve, a housing surrounding the valve, pipes leading from the housing to the ends of the cylinder and having perforated pipes communicating with them, said perforated pipes having removable ends in order that they may be cleaned, substantially as shown and described.

ALFRED F. COOK.

In presence of—
DAN W. KNEFLER,
E. TUDOR CRAIG.